United States Patent [19]

Wilson et al.

[11] Patent Number: 4,684,495
[45] Date of Patent: Aug. 4, 1987

[54] FUEL ASSEMBLY BOTTOM NOZZLE WITH INTEGRAL DEBRIS TRAP

[75] Inventors: John F. Wilson, Murrysville Boro; Robert K. Gjertsen, Monroeville Boro; Samuel Cerni, Churchill Boro, all of Pa.

[73] Assignee: Westinghouse Electric Corp., Pittsburgh, Pa.

[21] Appl. No.: 672,041

[22] Filed: Nov. 16, 1984

[51] Int. Cl.[4] .................. G21C 3/30; G21C 19/30; G21C 15/00
[52] U.S. Cl. .................. 376/352; 376/313; 376/364; 376/439; 376/446; 210/521
[58] Field of Search .............. 376/352, 313, 439, 440, 376/443, 446, 364, 224, 225, 353; 210/232, 519, 521, 320, 305, 478

[56] References Cited

U.S. PATENT DOCUMENTS

| | | | |
|---|---|---|---|
| 1,240,081 | 9/1917 | Moss | 210/521 |
| 3,182,003 | 5/1965 | Thorp, II et al. | |
| 3,205,148 | 9/1965 | Waine et al. | |
| 3,346,459 | 10/1967 | Prince et al. | 376/224 |
| 3,377,254 | 4/1968 | Frisch | |
| 3,379,619 | 4/1968 | Andrews et al. | 376/439 |
| 3,389,056 | 6/1968 | Frisch | |
| 3,395,077 | 7/1968 | Tong et al. | 376/439 |
| 3,481,832 | 12/1969 | Rickert | |
| 3,791,466 | 2/1974 | Patterson et al. | |
| 3,801,453 | 4/1974 | Jones | |
| 3,862,884 | 1/1975 | Jabsen | 376/440 |
| 3,879,259 | 4/1975 | Persson et al. | 376/224 |
| 3,933,584 | 1/1976 | Litt | 376/439 |
| 3,945,883 | 3/1976 | Hind et al. | |
| 4,053,358 | 10/1977 | Pennell | |
| 4,076,586 | 2/1978 | Bideau et al. | 376/364 |
| 4,089,741 | 5/1978 | Patterson et al. | 376/439 |
| 4,096,032 | 6/1978 | Mayers et al. | |
| 4,116,764 | 9/1978 | Jones | |
| 4,302,294 | 11/1981 | Lechercq | |
| 4,381,284 | 4/1983 | Gjertsen | 376/364 |
| 4,427,624 | 1/1984 | Marlatt et al. | |

FOREIGN PATENT DOCUMENTS

| | | | |
|---|---|---|---|
| 0102493 | 8/1979 | Japan | 376/313 |
| 4141989 | 11/1979 | Japan | 376/352 |
| 28977 | of 1906 | United Kingdom | 210/521 |
| 1214998 | 12/1970 | United Kingdom | |
| 0784890 | 12/1980 | U.S.S.R. | 210/521 |

Primary Examiner—Harvey E. Behrend

[57] ABSTRACT

An improved bottom nozzle of a fuel assembly includes a housing and a modified adapter plate formed by a network of ligaments which extend across the housing and are connected to the side walls of the housing a short distance below its upper peripheral edge so as to define an open region therein. The improved bottom nozzle also includes a debris trap having a structure disposed within the open region of the housing upon the adapter plate and adapted to capture and retain debris carried by collant flowing from openings in the lower core plate of the nuclear reactor to the fuel assembly. The trap structure is composed of a plurality of straps aligned with one another in a crisscross arrangement and defining a plurality of interconnected wall portions which form a multiplicity of small cells each having open opposite ends and a central channel for collant flow through the trap. A plurality of spring-like fingers are punched out of the wall portions and bent to extend into the cell channels toward the downstream end of the trap structure to provide means to capture and retain pieces of debris carried through the channels by flowing coolant. Also, leaf springs are attached to periphery of the structure and engagable with a plurality of recessed shoulders in the housing for releasably locking the trap structure in place in the open region with intersections formed by the straps aligned below the fuel rods of the fuel assembly.

13 Claims, 8 Drawing Figures

FUEL ASSEMBLY BOTTOM NOZZLE WITH INTEGRAL DEBRIS TRAP

CROSS REFERENCE TO RELATED APPLICATIONS

Reference is hereby made to the following co-pending United States patent applications dealing with subject matter related to the present invention:

1. "Debris Trap for a Pressurized Water Nuclear Reactor" by John F. Wilson et al, U.S. Ser. No. 672,040, filed Nov. 16, 1984.
2. "Wire Mesh Debris Trap for a Fuel Assembly" by William Bryan, U.S. Ser. No. 679,511, filed Dec. 7, 1984.

BACKGROUND OF THE INVENTION

1. Field of the Invention

The present invention relates generally to nuclear reactors and, more particularly, is concerned with a debris trap built into the bottom nozzle of a fuel assembly so as to combine the fuel rod retention and debris trap functions into a single component and thereby provide a lower overall pressure drop and a more compact bottom nozzle design.

2. Description of the Prior Art

During manufacture and subsequent installation and repair of components comprising a nuclear reactor coolant circulation system, diligent effort is made to help assure removal of all debris from the reactor vessel and its associated systems which circulate coolant therethrough under various operating conditions. Although elaborate procedures are carried out to help assure debris removal, experience shows that in spite of the safeguards used to effect such removal, some chips and metal particles still remain hidden in the systems.

In particular, fuel assembly damage due to debris trapped at the bottom grid has been noted in several reactors in recent years. The damage consists of fuel rod tube perforations caused by fretting of debris in contact with the exterior of the tube. The debris tends to be relatively thin rectangular pieces, as opposed to pieces which are spherical in shape. Specifically, most of the debris consists of metal turnings which were probably left in the primary system after steam generator repair or replacement. The debris lodges in the region of the lowermost grid within the spaces between its "egg-crate" shaped cell walls and the lower end portions of the fuel rod tubes. Almost all of the debris is deposited just above the four coolant flow openings in the lower core support plate.

Several different approaches have been proposed and tried for carrying out removal of debris from nuclear reactors. Many of these approaches are discussed in U.S. Pat. No. 4,096,032 to Mayers et al. While all of the approaches described in this patent operate reasonably well and generally achieve their objectives under the range of operating conditions for which they were designed, a need still exists for a fresh approach to the problem of debris removal in nuclear reactors. The new approach must be compatable with the existing structure and operation of the components of the reactor, be effective throughout the operating cycle of the reactor, and at least provide overall benefits which outweigh the costs it adds to the reactor.

SUMMARY OF THE INVENTION

The present invention provides an improved bottom nozzle integrally incorporating a debris trap designed to satisfy the aforementioned needs. Heretofore, the bottom nozzle of the fuel assembly had an upper adapter plate which performed two basic functions. First, the pre-existing bottom nozzle adapter plate served as an essential bottom structural component of the fuel assembly. The adapter plate incorporated sufficient solid framework to support and rigidly anchor the guide thimbles of the assembly thereon. Second, the adapter plate acted as a fuel rod retainer while directing the distribution of coolant flow to the rest of the fuel assembly. The adapter plate included additional solid framework sufficient to provide a platform which limited downward displacement of the fuel rods of the fuel assembly should the fuel rods become detached from the fuel assembly grids. The total overall solid framework of the pre-existing adapter plate thus needed to enable the plate to carry out these two functions, made it a rather thick mass with small coolant flow holes and high pressure loss. To now add a backfittable debris trap to the pre-existing bottom nozzle would increase the pressure drop of the nozzle to an even more unacceptably high level.

Underlying the present invention is the recognition that the pre-existing bottom nozzle adapter plate need not perform what has heretofore been its dual functional role: guide thimble support and fuel rod retention. Instead, in arriving at the present invention, it was perceived that by strategic positioning of an appropriate debris trap in the bottom nozzle, the trap, in addition to carrying out its debris capturing and retaining function, would also inherently perform the fuel rod retention function provided heretofore by the adapter plate. Thus, by eliminating the necessity for the adapter plate to carry out the fuel rod retention function, the adapter plate could then be modified to a simplier design, one which would decrease the overall complexity of its framework and thereby decrease the overall pressure drop across the nozzle by at least as much as the incorporation of the debris trap increased it. As it turned out, the improved bottom nozzle design of the present invention, in combining the fuel rod retention function with the debris capturing and retaining function of the trap, achieved a lower overall pressure drop and a more compact structure than the pre-existing bottom nozzle. It should be mentioned that the debris trap per se has much the same structure as that of the debris trap disclosed in the first U.S. patent application cross-referenced above. However, the improved bottom nozzle of the present invention is distinguished from the bottom nozzle of the first cross-referenced application by the combination of the debris trap and modified adapter plate as employed in the improved bottom nozzle disclosed herein.

Accordingly, the present invention sets forth in a fuel assembly for a nuclear reactor including a plurality of nuclear fuel rods, at least one grid supporting the fuel rods in an organized array, and at least one guide thimble supporting the grid, an improved end nozzle disposed adjacent the grid, supporting the guide thimble and adapted to allow flow of liquid coolant into the fuel assembly. The improved end nozzle includes: (a) means supporting the guide thimble and allowing flow of coolant into the fuel assembly; (b) means mounted about the supporting means so as to define therewith an open region above the supporting means; and (c) a trap disposed within the open region and adapted for passage of the guide thimble therethrough to the supporting means and the flow of coolant therethrough for capturing and retaining debris carried by the flowing coolant to prevent entry of debris into the fuel assembly.

More particularly, the supporting means is a network of interconnected structural members and the debris trap includes a structure disposed above the network of members and within the open region on the same side of the network of members as the grid. The debris trap structure forms a multiplicity of small cells each being open at opposite ends and defining a central channel for passage of coolant flow therethrough to the fuel assembly. The structure also includes means defined in each of the cells for capturing and retaining within the structure any debris carried into the cells by the coolant flowing therethrough. Further included are interconnected wall portions forming each of the cells and defining the central channel thereof, with the capturing and retaining means being in the form of a spring-like finger attached to one of the wall portions and extending into the channel of the cell and downstream away from the network of members.

More specifically, the structure is composed of a plurality of straps aligned with respect to each other in a crisscross interlocking arrangement and defining the wall portions of each cell in oppositely disposed interconnected pairs thereof. One spring-like finger is punched out of each wall portion of each pair thereof, and the fingers on one pair of wall portions are disposed in the cell downstream of and in overlapping relation with the fingers on the other pair of wall portions.

Additionally, the means mounted about the network of members defining the open region is a housing formed by interconnected side walls having a plurality of inwardly-facing recessed shoulders formed therein. The structure of the debris trap is sized to fit within the open region of the interconnected side walls and includes means in the form of a plurality of leaf springs engagable within the recessed shoulders for releasably locking the structure within the open region above the network of members in the housing. The intersections formed by the crisscross arrangement of straps making up the structure underlie and are aligned with the respective fuel rods of the fuel assembly such that a platform is provided for catching any fuel rod which should happen to drop in the fuel assembly. The straps also incorporate at least one hub disposed in alignment with guide thimble attaching and anchoring means in the network of members and the guide thimble of the fuel assembly to permit passage of the thimble through the structure of the trap and into engagement with the attaching means such as a boss on the network of members.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:.

DETAILED DESCRIPTION OF THE INVENTION

Figure 1:
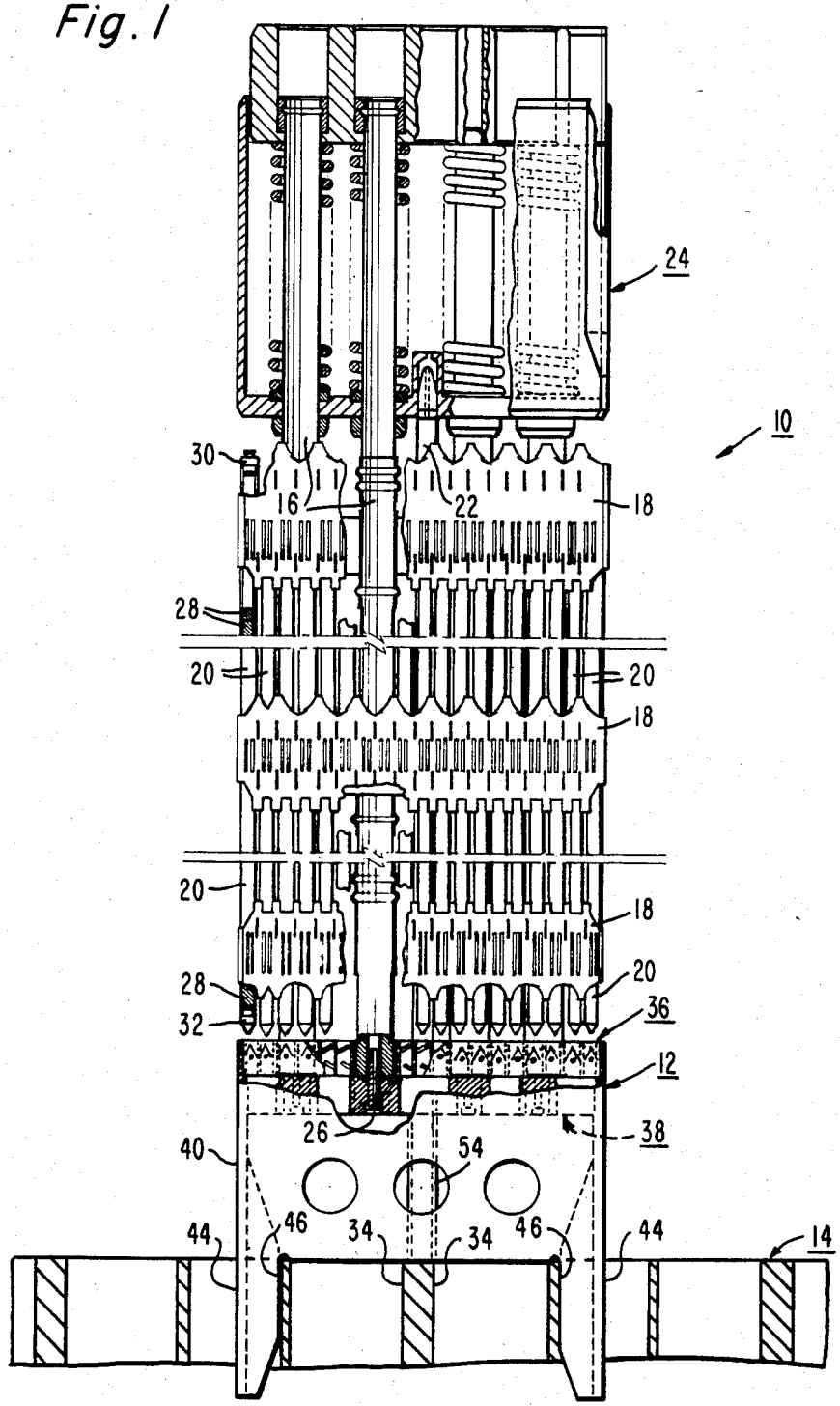
FIG. 1 is an elevational view, partly in section, of a fuel assembly which incorporates the improved bottom nozzle of the present invention, the assembly being illustrated in vertically foreshortened form with parts broken away for clarity.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

IN GENERAL

Referring now to the drawings, and particularly to FIG. 1, there is shown a partially sectioned elevational view, with parts broken away for clarity, of a fuel assembly constructed in accordance with well-known practices, being generally designated by the numeral 10, which incorporates a preferred embodiment of the invention.

The fuel assembly 10 basically includes a lower end structure in the form of an improved bottom nozzle 12 for supporting the assembly on a lower core support plate 14 in the core region of a reactor (not shown), and a number of longitudinally extending guide tubes or thimbles 16 which project upwardly from the improved bottom nozzle 12. The assembly 10 further includes a plurality of transverse grids 18 axially spaced along the guide thimbles 16 and an organized array of elongated fuel rods 20 transversely spaced and axially supported by the grids 18. Also, the assembly 10 has an instrumentation tube 22 located in the center thereof. Attached to the upper end portions of the guide thimbles 16 is an upper end structure or top nozzle with hold-down means incorporated therewithin, generally designated by the numeral 24. With such an arrangement of parts, the fuel assembly 10 forms an integral unit capable of being conveniently handled without damaging the assembly parts.

To form the fuel assembly 10, the transverse grids 18 are first attached to the longitudinally extending guide thimbles 16 at predetermined axially spaced locations. Next, the fuel rods 20 are inserted from below through the grids 18, and the improved bottom nozzle 12 is then suitably attached, such as by machine screws 26 (only one being shown), to the lower end portions of the guide thimbles 16. Finally, the top nozzle 24 is attached to the upper end portions of the guide thimbles 16.

As mentioned above, the fuel rods 20 in the array thereof in the assembly 10 are held in spaced relationship with one another by the grids 18 spaced along the fuel assembly length. Each fuel rod 20 includes nuclear fuel pellets 28 and is closed at its opposite ends by upper and lower end plugs 30,32. The fuel pellets 28 composed of fissile material are responsible for creating the reactive power of the reactor. A liquid moderator/coolant such as water, or water containing boron, is pumped upwardly through a plurality of flow openings 34 in the lower core plate 14 to the fuel assemblies. The coolant flows upwardly into the fuel assembly 10 through its improved bottom nozzle 12 and therefrom through the guide thimbles 16 and along the fuel rods 20 of the fuel assembly in order to extract heat generated therein for the production of useful work. To control the fission process, a number of control rods (not shown) are reciprocally movable in the guide thimbles 16 located at predetermined positions in the fuel assembly 10.

IMPROVED BOTTOM NOZZLE WITH INTEGRAL DEBRIS TRAP

As mentioned above, fuel assembly damage due to debris trapped at the lowermost one of the grids 18 has been noticed in recent years. Therefore, to prevent occurrence of such damage, it is highly desirable to trap and remove this debris before it reaches the lowermost grid 18.

The present invention relates to the improved bottom nozzle 12 of the fuel assembly 10 which uniquely combines a debris trap, generally indicated by the numeral 36, and a modified central adapter plate 38 so as to carry out the functions of capturing and retaining debris, limiting fuel rod displacement and supporting the guide thimbles without increasing the overall pressure drop across the bottom nozzle above that experienced in the case of the pre-existing bottom nozzle which did not have a debris trap.

Figure 2:
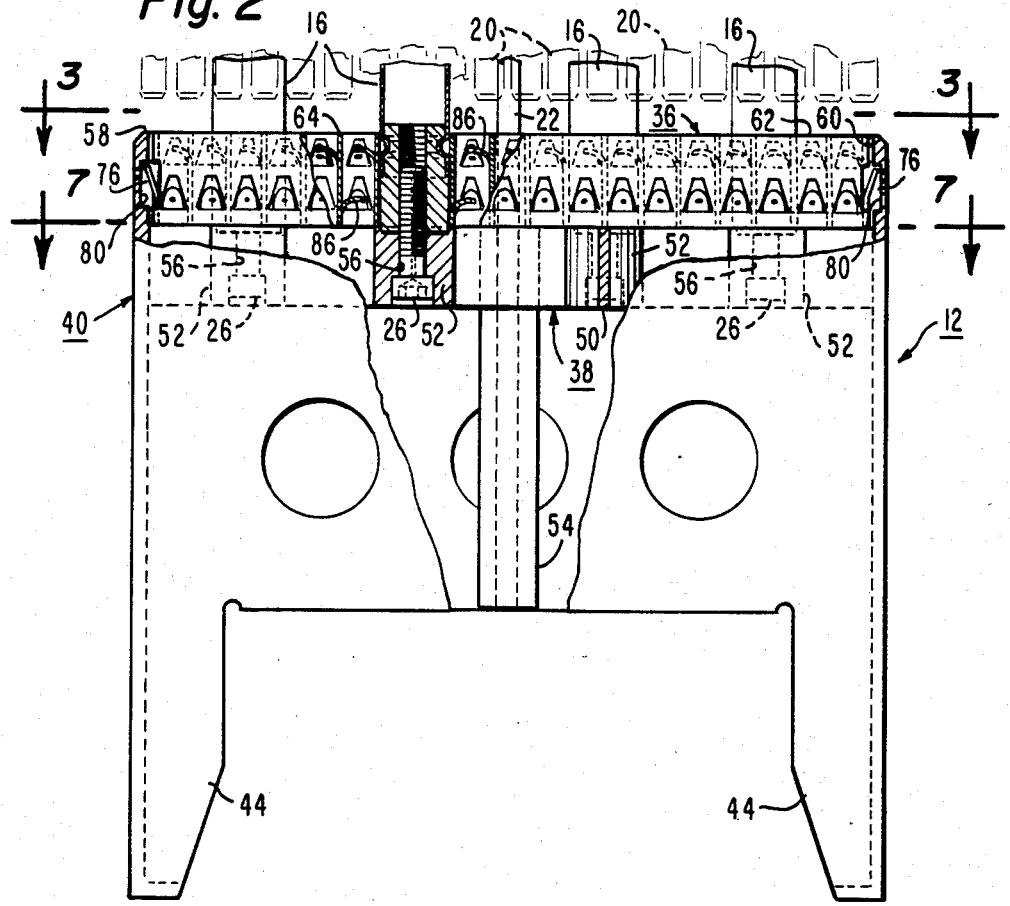
FIG. 2 is an enlarged fragmentary elevational view of the fuel assembly of FIG. 1, illustrating the improved bottom nozzle of the fuel assembly, partly in sectional form and partly broken away.
Figure 7:
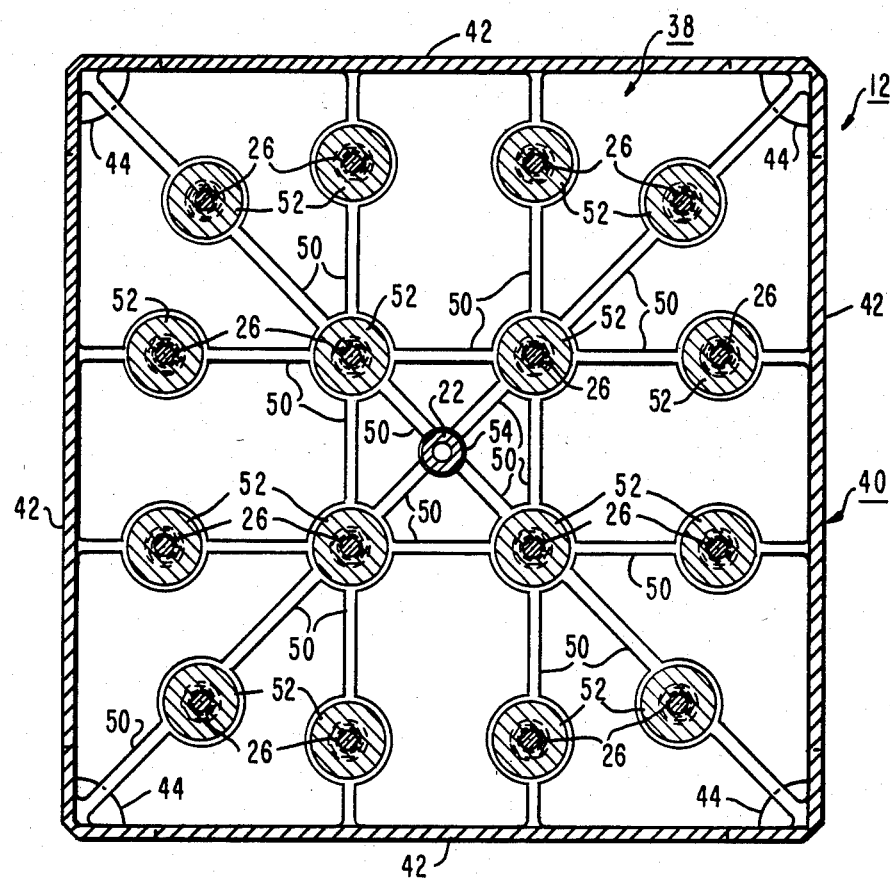
FIG. 7 is a top plan view of the modified adapter plate of the improved bottom nozzle as seen along line 7—7 of FIG. 3, illustrating the guide thimbles, in sectional form, attached and anchored in hubs of the adapter plate.

Referring again to FIG. 1 and also to FIG. 2, the improved bottom nozzle 12 includes a skirt or housing 40 formed by four interconnected, upstanding side walls 42, which surround the modified central adapter plate 38 of the nozzle, and four legs 44 extending downwardly from the four corners of the housing 40 (see also FIG. 7). In an exemplary embodiment, the bottom nozzle 12 is fabricated as a stainless steel casting. The corner legs 44 of the bottom nozzle 12 seat in holes 46 provided in the lower core plate 14 along with corresponding legs from the three adjacent fuel assemblies. Also, in the lower core plate 14, the series of openings 34, usually four in number, are aligned with the modified central adapter plate 38 of the bottom nozzle 12 and provide paths for coolant flow through the lower core plate to the fuel assembly 10.

As depicted in FIG. 7, the modified adapter plate 38 of the improved bottom nozzle 12 is made up of a network of interconnected members in the form of crisscross and diagonally-extending ligaments 50 which extend across the space within the housing 40 and are connected at their outer ends at the inside of the housing side walls 42. The ligaments 50 of the adapter plate 38 support attaching means such as a plurality of bosses 52 for anchoring the lower end portions of the guide thimbles 16 and a central guide sleeve 54 which extends downward to the elevation of the bottom peripheral edge of the housing 40 to where it contacts the lower core plate 14. The guide thimble bosses 52 have countersunk through-holes 56 which receive the machine screws 26 for attaching and anchoring the lower end portions of the guide thimbles 16 to the adapter plate 38. The guide sleeve 54 receives the lower end portion of the instrumentation tube 22 and also serves to support the center of the modified adapter plate 38 so as to minimize the structural strength requirement of its network of ligaments 50. While the housing 40 and legs 44 of the improved bottom nozzle 12 are per se substantially the same as in the pre-existing bottom nozzle, the modified adapter plate 38 in being formed by the network of ligaments 50 is not only structurally different but also provide much more open space for coolant flow than heretofore and thus has a lower pressure drop across it.

As seen in FIGS. 1 and 2, the debris trap 36 of the improved bottom nozzle 12 is disposed above the modified adapter plate 38. Specifically, the ligaments 50 of the adapter plate 38 are attached to the housing side walls 42 a short distance below the upper peripheral edge 58 of the housing 40 so as to define an open region 60 within the upper portion of the housing above the adapter plate. The trap 36 is dimensioned to fit within the open region 60 and thus be positioned across the path of coolant flow from the lower core plate openings 48 and through the open space of the ligament network of the modified adapter plate 38. In such position, the trap 36 will capture debris, such as small loose parts or pieces, from the flowing coolant and thereby prevent it from entering the fuel assembly 10. Instead, the debris is retained within the trap 36 which permits removal of the debris along with the fuel assembly 10 at the next refueling cycle.

Figure 3:
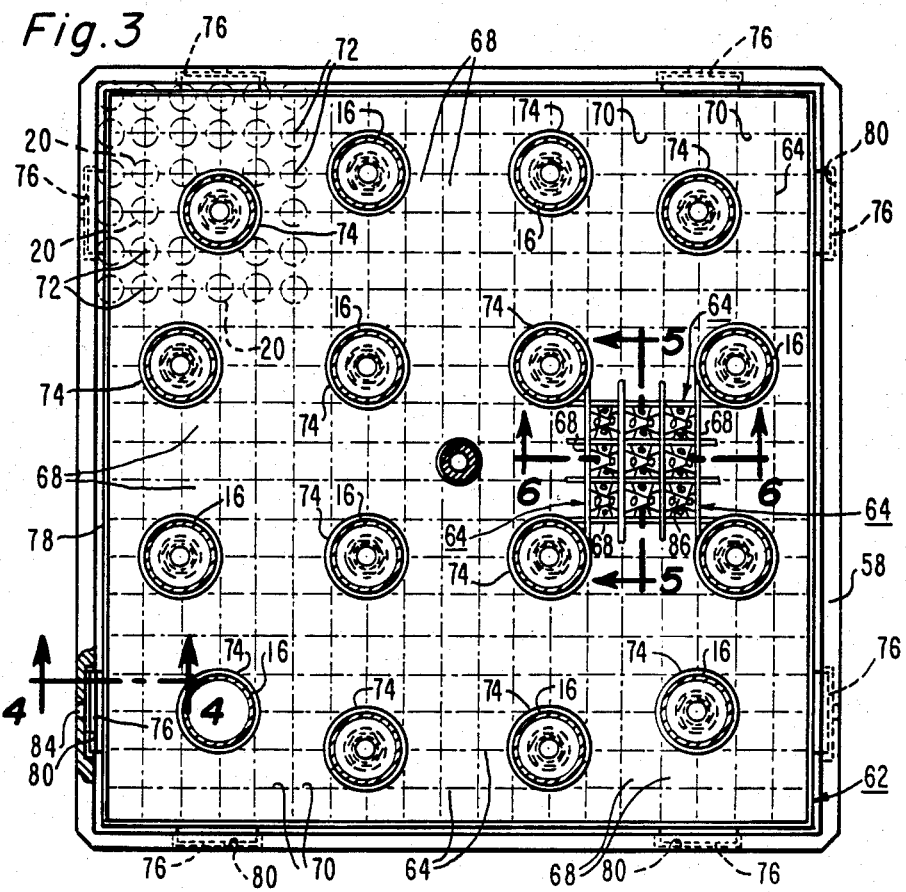
FIG. 3 is a top plan view of the debris trap disposed in the open region of the bottom nozzle as seen along line 3—3 of FIG. 2, illustrating the guide thimbles, in sectional form, extending through passages in the trap and showing only a few of the cells of the trap structure and spring-like fingers disposed therein.

Turning now to FIG. 3, the debris trap 36 includes a structure 62 being composed of a plurality of straps 64, for instance made of stainless steel material, which are aligned with respect to each other in a cross-laced or crisscross interlocking arrangement. The straps 64 in such an arrangement define a plurality of interconnected wall portions 66 which form a multiplicity of cells, each being generally designated as 68, with any given interior one of the wall portions 66 being shared by two adjacent ones of the cells 68. Each four interconnected wall portions 66, which form a given one of the cells 68, define the cell 68 with open opposite ends and a central channel 70 extending generally parallel to the path of coolant flow for passage of coolant therethrough to the interior of the fuel assembly 10. Each cell 68 has a width to depth ratio that is less than one.

As also seen in FIG. 3, the intersections 72 formed by the crisscross arrangement of the straps 64 making up the debris trap structure 62 underlie and are aligned with the respective fuel rods 20, which are illustrated in dashed outline form in the figure. In such way, the debris trap structure 62 acts as a platform for catching any one of the fuel rods 20 which might inadvertently become free of the grids 18 and drop downward during operation of the reactor core. As mentioned earlier, in the pre-existing bottom nozzle, its adapter plate served this function. Further in FIG. 3, there is shown a plurality of hubs 74 supported by the crisscross straps 64 in alignment with the guide thimble bosses 52 in the adapter plate 38. The hubs 74 permit passage of the thimbles 16 through the structure 62 of the debris trap 36 and into engagement with the bosses 52 in the adapter plate 38.

Figure 4:
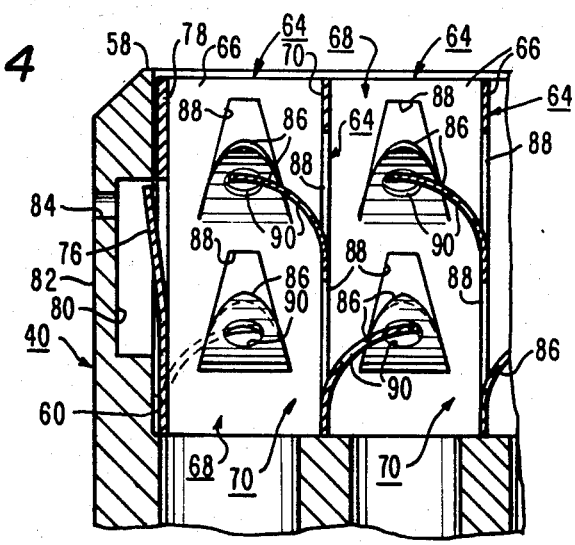
FIG. 4 is an enlarged fragmentary view, partly in section, of a portion of the side wall of the improved bottom nozzle and a leaf spring on the debris trap structure engaged with a recessed shoulder in the side wall for releasably locking the trap within the bottom nozzle, as seen along line 4—4 of FIG. 3.

The debris trap 36 includes means in the form of a plurality of leaf springs 76 integrally formed on and bent slightly outward from the peripheral wall 78 of the trap structure 62. When the trap structure 62 is disposed in the open region 60 of the housing 40 above and resting upon the ligaments 50 of the modified adapter plate 38, the springs 76 extend within and are engageable with a plurality of inwardly-facing recessed shoulders 80 formed in the upper peripheral portion 82 of the housing 40 which defines the open region 60. In the position of the spring 76 shown in FIG. 4, it locks the structure 62 within the open region 60. To remove the trap structure 62 from the housing 40, the bottom nozzle 12 must be removed from the fuel assembly 10 and a tool (not shown) must be inserted through a hole 84 extending through the housing portion 82 and into the recessed shoulder 80 in order to deflect the spring 76 inwardly away from the recessed shoulder.

The debris trap 36 also includes means in the form of a plurality of spring-like fingers 86 defined in each of the cells 68 for capturing and retaining within the structure 62 any debris carried into the cells 68 by coolant flowing therethrough. Each wall portion 66 which is common to two adjacent cells 68 has at least two fingers 86 attached to it at two levels, one above the other. Each finger 86 is punched out of material of the strap 64 forming the wall portion 66 and bent so as to extend into the cell channel 70 and point downstream toward the interior of the fuel assembly 10. Specifically, with respect to the two fingers 68 punched out of any common wall portion 66, one finger 86 extends into one of the adjacent cells 68 sharing the common wall portion 66, while the other finger 86 extends into the other of the adjacent cells.

Figure 8:
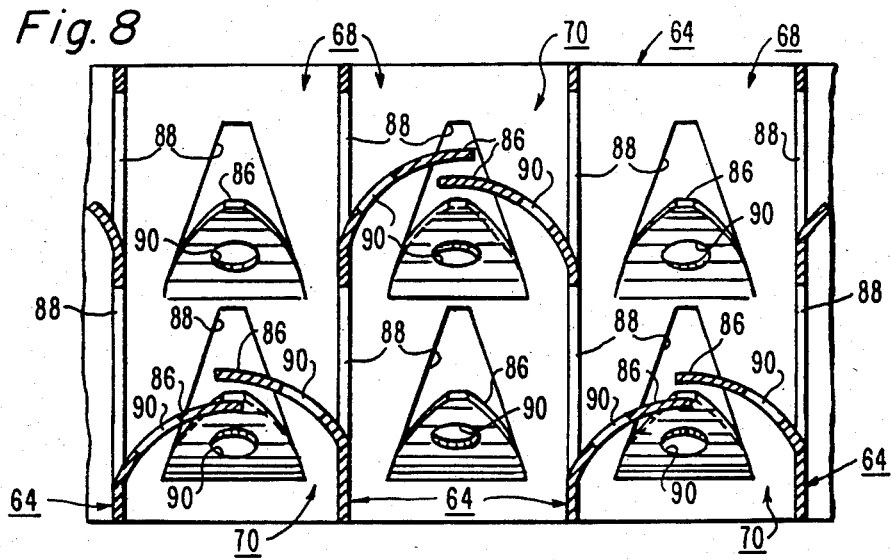
FIG. 8 is an enlarged fragmentary view of the debris trap structure, partly in section, similar to that of FIG. 5, but showing another arrangement of the spring-like fingers projecting from the wall portions of the cells and into the channels defined through the cells by the wall portions.
Figure 6:
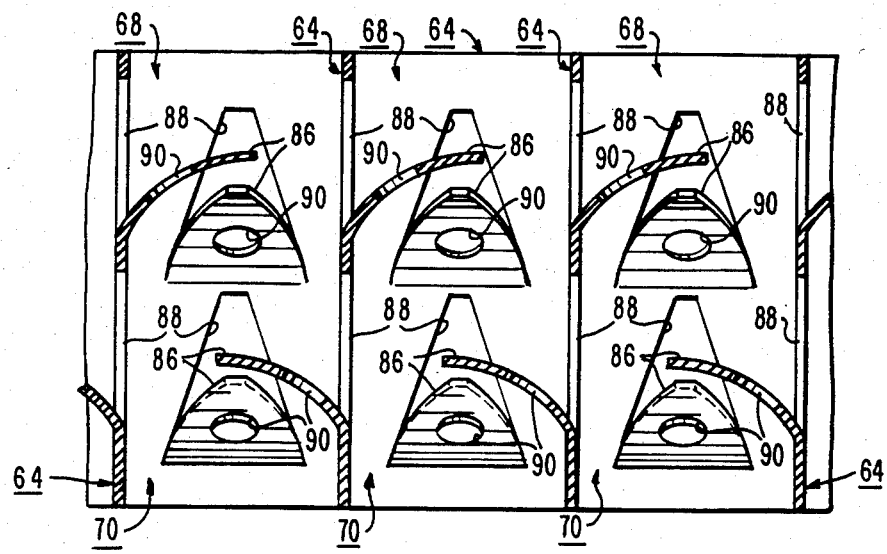
FIG. 6 is an enlarged fragmentary view of the debris trap structure, partly in section, as seen along line 6—6 of FIG. 3, showing the same arrangement of fingers as seen in FIG. 5 but from a viewing position located ninety degrees from that of FIG. 5.
Figure 5:
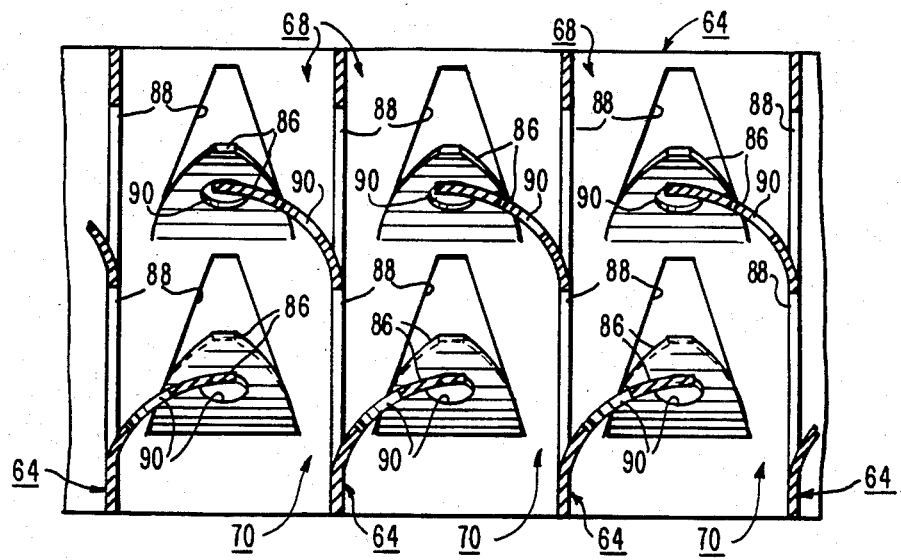
FIG. 5 is an enlarged fragmentary view of the debris trap structure, partly in section, as seen along line 5—5 of FIG. 3, showing one arrangement of the spring-like fingers projecting from the wall portions of the cells and into the channels defined through the cells by the wall portions.

FIGS. 5, 6 and 8 show various combinations of arrangements of the fingers 86 in the respective cells 68. In one form of the finger arrangement shown in FIGS. 5 and 6, the fingers 86 on oppositely-facing wall portions 66 of a given cell 68 are disposed at two different levels. Thus, in this arrangement, the two fingers 86 at the same level are displaced ninety degrees from each other on wall portions 66 which are connected to one another. In another form of the finger arrangement shown in FIG. 8, the fingers 86 on oppositely-facing wall portions 66 of a given cell 68 are disposed at the same level. Thus, the two fingers 86 at the same level in this arrangement are displaced one hundred eighty degrees from each other. However, in both arrangements, the two fingers 86 at each level overlap at their respective tip ends one slightly above the other. Further, in both arrangements, the overlapped tips of the two fingers at the upper level, in turn, overlap the overlapped tips of the two fingers at the lower level in each cell 68. In such manner, the channel 70 through the cell 68 is obstructed by the fingers 86 and the overlapping and spaced apart relationship between the upper and lower sets of fingers 86 provides several regions in the cell channel 70 within which pieces of debris can be trapped and retained in the structure 62. The resilient or spring-like nature of each finger 86 gives it the capability of imposing a lateral force on a piece of debris so as to force it against the wall portion 66 and retain the debris in the trap 36.

Even though the fingers 86 obstruct the cell channel 70, they only minimally impede the flow of coolant through the trap 36. First, each wall portion 66 has an opening 88 formed therein at the region where the finger was punched out which facilitates cross flow of coolant through the wall portions 66 between individual ones of the cells 68. Also, each finger 86 has a hole 90 formed through it which allows increased flow of water through the cell.

It is thought that the improved bottom nozzle of the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a fuel assembly for a nuclear reactor including a plurality of nuclear fuel rods, at least one grid supporting said fuel rods in an organized array, and at least one guide thimble supporting said grid, an improved bottom nozzle disposed adjacent and below said grid, supporting said guide thimble and adapted to allow flow of liquid coolant into said fuel assembly, said improved bottom nozzle comprising:

(a) means spaced below said grid and a lower end of said fuel rods and supporting said guide thimble and allowing flow of coolant into said fuel assembly;

(b) means mounted about said supporting means and extending toward but spaced from said grid and lower end of said fuel rods so as to define an open region between said supporting means and said grid and lower end of said fuel rods; and (c) a trap disposed within said open region and on said supporting means, said trap being adapted for passage of said guide thimble therethrough to said supporting means and flow of said coolant therethrough for capturing and retaining debris carried by said flowing coolant within said trap to substantially prevent entry of debris into said fuel assembly, said trap including (i) a structure disposed within and extending across said open region adjacent said supporting means, said structure being composed of a plurality of straps aligned with respect to each other in a crisscross interlocking arrangement so as to define a plurality of intersections disposed below and aligned respectively with said fuel rods, said straps also defining wall portions forming a multiplicity of small cells each being open at opposite ends and defining a central channel for passage of coolant flow therethrough to said fuel assembly, said wall portions of each cell being defined in oppositely-disposed interconnected pairs thereof, some of said wall portions being common to two adjacent cells, and (ii) means disposed in each of said cells and extending into said channel thereof for capturing and retaining within said structure debris carried into said cells by said coolant flowing therethrough, said capturing and retaining means in each cell being in the form of spring-like fingers punched out of respective ones of said wall portions of said cell and bent to extend both vertically and horizontally into said channels of said cell and other cells adjacent thereto, one pair of said fingers on one pair of said wall portions in a cell being disposed downstream from and in overlapping relation with another pair of said fingers on another pair of said wall portions in said cell such that a fuel rod cannot enter said cell, said wall portions which are common to two adjacent cells having a pair of said fingers punched out therefrom being located upstream and downstream from one another and extending oppositely into separate ones of said two adjacent cells.

2. The improved end nozzle as recited in claim 1, wherein said supporting means includes:
   a network of interconnected elongated structural members defining open spaces for flow of coolant therethrough; and
   means on said members for attaching and anchoring said guide thimble thereto.

3. The improved end nozzle as recited in claim 1, wherein said finger has at least one hole defined therethrough.

4. The improved end nozzle as recited in claim 1, wherein said structure has cross-sectional dimensions sized to fit said structure within said open region and said trap further includes means on said structure for releasably locking it within said means mounted about said supporting means and defining said open region.

5. The improved end nozzle as recited in claim 4, wherein said locking means is in the form of a plurality of leaf springs disposed on the periphery of said structure and engagable with said means defining said open region.

6. In a liquid cooled nuclear reactor having a plurality of fuel assemblies supported on a lower core plate, each of said fuel assemblies and said lower core plate being constructed to allow coolant flow therethrough, said fuel assembly including a plurality of nuclear fuel rods, a plurality of grids axially disposed along and supporting said fuel rods in an organized array, and a plurality of guide thimbles supporting said grids, an improved bottom nozzle disposed adjacent a lowermost one of said grids, supporting said guide thimbles spaced above said lower core plate and adapted to allow flow of liquid coolant into said fuel assembly from said lower core plate, said improved bottom nozzle comprising:

(a) a housing formed by a plurality of interconnected, upstanding side walls having upper and lower peripheral edges and adapted to rest at said lower peripheral edge thereof upon said lower core plate and spaced at said upper peripheral edge from said lowermost grid;

(b) a network of interconnected structural members disposed within said housing and extending across said housing between said side walls thereof, said members being connected to said side walls a short distance below said upper peripheral edge of said housing so as to define an open region within said upper portion of said housing above said network of members and below said lowermost grid, said members together defining open space for flow of coolant therethrough to said fuel assembly;

(c) means supported on said network of members for attaching and anchoring said guide thimbles to said members; and (d) a trap disposed within said open region and adapted for passage of said guide thimble therethrough to said network of members and the flow of said coolant therethrough for capturing and retaining debris carried by said flowing coolant within said trap to substantially prevent entry of debris into said fuel assembly, said trap including (i) a structure disposed upon said network of members and within and extending across said open region of said upper portion of said housing in a path of coolant flow from said core plate through said spaces between said network of members and to said fuel assembly, (ii) said structure being composed of a plurality of straps aligned with respect to each other in a crisscross arrangement so as to define a plurality of intersections disposed below and aligned respectively with said fuel rods, said straps defining a plurality of interconnected wall portions which form a multiplicity of cells each being open at opposite ends and defining a central channel extending generally parallel to said path of coolant flow for passage of coolant flow therethrough to said fuel assembly, said wall portions of each cell being defined in oppositely-disposed interconnected pairs thereof, some of said wall portions being common to two adjacent cells, and (iii) a plurality of spring-like fingers disposed in each cell and extending into said channel thereof for capturing and retaining within said structure debris carried into said cell by said coolant flowing therethrough, said spring-like fingers being punched out of respective ones of said wall portions of said cell and bent to extend both vertically and horizontally into said channel of said cell and other cells adjacent thereto, one pair of said fingers on one pair of said wall portions in a cell being disposed downstream from and in overlapping relation with another pair of said fingers on another pair of said wall portions in said cell such that a fuel rod cannot enter said cell, said wall portions which are common to two adjacent cells having a pair of said fingers punched out therefrom being located upstream and downstream from one another and extending oppositely into separate ones of said two adjacent cells.

7. The improved bottom nozzle as recited in claim 6, further comprising an elongated sleeve centrally located with respect to said network of members and connected thereto, said sleeve extending downwardly therefrom and into contact with said lower core plate for supporting said network of members thereon.

8. The improved bottom nozzle as recited in claim 6, wherein said network of members takes the form of a network of interconnected crisscross-and diagonally-extending ligaments which extend across said housing and are connected at their outer ends to said housing side walls.

9. The improved bottom nozzle as recited in claim 8, wherein said attaching and anchoring means takes the form of a plurality of bosses being supported on said network of ligaments.

10. The improved bottom nozzle as recited in claim 6, wherein said each finger has at least one hole defined therethrough.

11. The improved bottom nozzle as recited in claim 6, wherein said each wall portion has an opening formed therein at the region where said finger was punched out, said openings in said wall portions facilitating cross flow of coolant between individual ones of said cells.

12. The improved bottom nozzle as recited in claim 6, further comprising means on said structure for releasably locking it within said open region of said upper portion of said housing.

13. The improved bottom nozzle as recited in claim 12 wherein said locking means is in the form of a plurality of leaf springs disposed on the periphery of said structure and engagable within a plurality of recessed shoulders formed in said upper portion of said housing.

* * * * *